| | |
|---|---|
| (12) | United States Patent  Kim |
| (10) Patent No.: | US 10,277,869 B2 |
| (45) Date of Patent: | Apr. 30, 2019 |

(54) EFFICIENT PROCESS FOR CAMERA CALL-UP

(71) Applicant: SENSORMATIC ELECTRONICS, LLC, Boca Raton, FL (US)

(72) Inventor: Samuel Uk Kim, Saratoga, CA (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 146 days.

(21) Appl. No.: 14/567,008

(22) Filed: Dec. 11, 2014

(65) Prior Publication Data

US 2016/0173828 A1 Jun. 16, 2016

(51) Int. Cl.
*H04N 7/18* (2006.01)
*H04N 5/232* (2006.01)
*H04N 17/00* (2006.01)

(52) U.S. Cl.
CPC ......... *H04N 7/181* (2013.01); *H04N 5/23206* (2013.01); *H04N 17/002* (2013.01)

(58) Field of Classification Search
CPC .................................................... H04N 7/181
USPC ........................................................ 348/144
See application file for complete search history.

(56) References Cited

U.S. PATENT DOCUMENTS

| | | | | |
|---|---|---|---|---|
| 6,816,184 | B1* | 11/2004 | Brill | G06K 9/00771 348/143 |
| 2007/0076094 | A1* | 4/2007 | Dickerson | G08B 13/19645 348/143 |
| 2007/0097460 | A1* | 5/2007 | Kawai | H04N 7/181 358/500 |
| 2010/0214417 | A1* | 8/2010 | Gennari | G06T 7/004 348/159 |
| 2011/0013018 | A1* | 1/2011 | Leblond | G06T 17/05 348/143 |
| 2011/0055290 | A1* | 3/2011 | Li | G06F 17/30241 707/807 |
| 2011/0115805 | A1* | 5/2011 | Ahn | G09B 29/106 345/581 |
| 2011/0187741 | A1* | 8/2011 | Akiya | G09B 29/10 345/625 |
| 2011/0193966 | A1* | 8/2011 | Golan | H04N 7/181 348/159 |
| 2011/0317016 | A1* | 12/2011 | Saeki | G08B 13/19613 348/154 |
| 2012/0005483 | A1* | 1/2012 | Patvarczki | G06F 21/36 713/182 |

(Continued)

OTHER PUBLICATIONS

Karim Nice, Tracy V. Wilson & Gerald Gurevich "How Digital Cameras Work" Nov. 29, 2006. HowStuffWorks.com. <http://electronics.howstuffworks.com/cameras-photography/digital/digital-camera.htm> Oct. 25, 2016.*

*Primary Examiner* — Tat C Chio
*Assistant Examiner* — Fabio S Lima
(74) *Attorney, Agent, or Firm* — Foley & Lardner LLP

(57) ABSTRACT

A surveillance system includes one or more camera systems at least some of the camera systems including a camera element comprising optical components to capture and process light to produce images, camera processing circuitry that receives the light and processes the light into electrical signals and encodes the signals into a defined format, power management circuitry to power the camera system, the power management system including first and second power interfaces and first and second video output interfaces.

15 Claims, 5 Drawing Sheets

(56) References Cited

U.S. PATENT DOCUMENTS

2013/0010111 A1* 1/2013 Laforte ............ G08B 13/19645
348/143
2014/0141803 A1* 5/2014 Marti .................... H04W 4/043
455/456.2
2015/0145991 A1* 5/2015 Russell .................. H04N 7/181
348/143

* cited by examiner

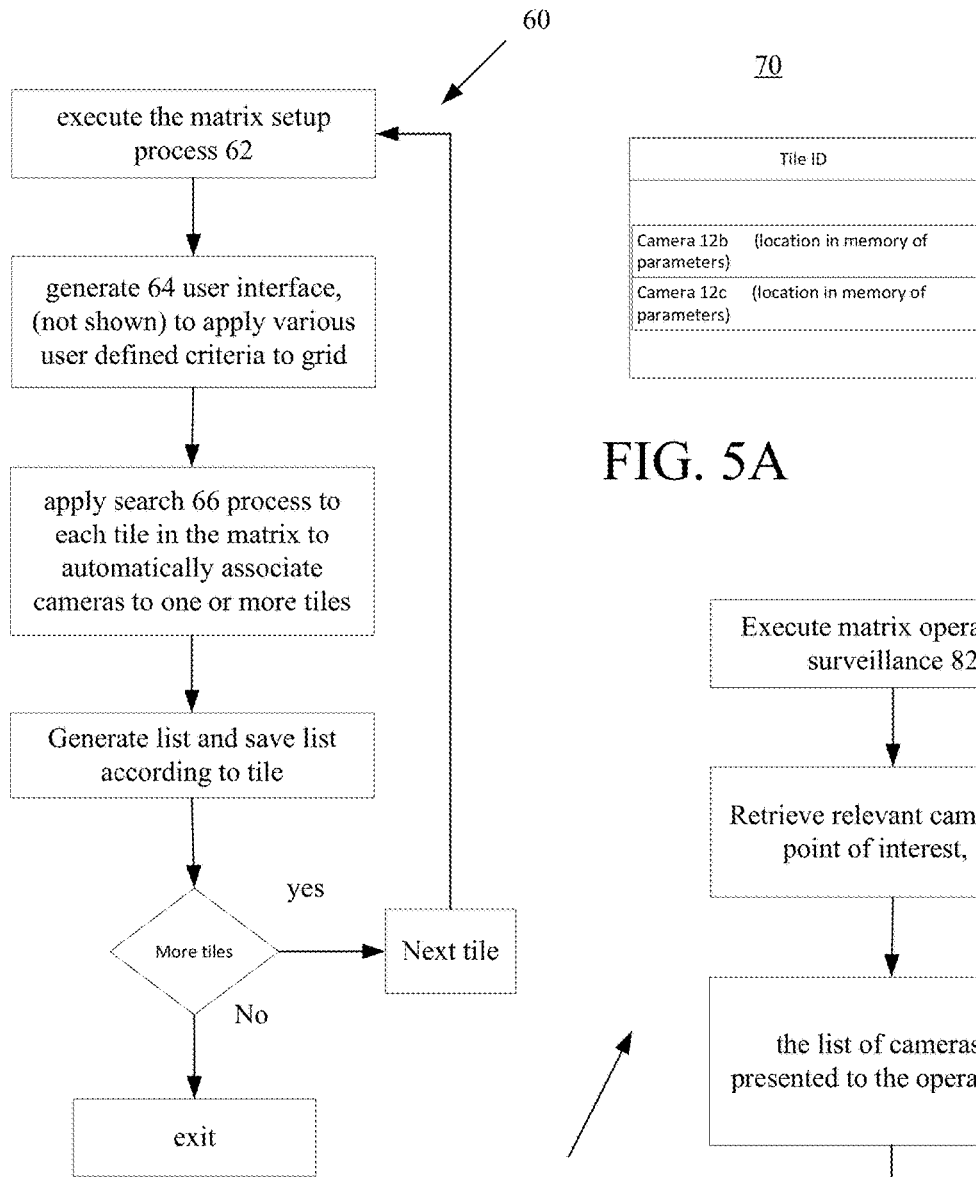
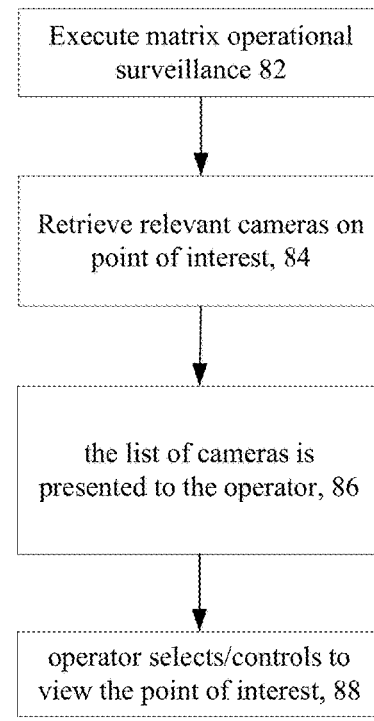
FIG. 5
FIG. 5A
FIG. 6

EFFICIENT PROCESS FOR CAMERA CALL-UP

BACKGROUND

This description relates to operation of surveillance systems.

It is common for businesses to have a surveillance system for detecting presence of conditions at their premises, and for sending video from cameras to a central monitoring station. It is especially common for wide areas such as central business districts to have many such cameras that are monitored by operators at central monitoring stations. Operators at stations can view a geo-referenced image on a computer screen with camera locations represented by objects displayed on the image. The image can vary from a satellite image, an overhead image captured by a terrestrial camera or a map. When an operator has identified a point of interest on the image, the operator may desire to view relevant live or recorded video and/or audio or still images for that point of interest.

However, locating an appropriate camera or cameras can be difficult especially when there are many such cameras and the cameras have different properties, such as being fixed or having pan and/or zoom capabilities, as well as the cameras' physical locations and the cameras' field of view. Such a problem is partially solved by a combination of a direct geospatial search & rank and direct association of a camera with potential partner cameras. One problem arises however is that as the number of cameras becomes large it may take an unacceptable amount of time to find and control relevant cameras to the point of interest with a search and rank direct association approach.

SUMMARY

One of the major limitations of traditional surveillance systems is that while a system can generate a list of cameras for viewing by accessing knowing the Global Positioning System (GPS) location of the point of interest and GPS locations of available cameras, as the number of cameras become large, this search and rank process will take longer and longer to return a viable set of relevant cameras. In addition, this search & rank process does not take into consideration the field of view (FOV) of the cameras and, thus may select a camera having a FOV that is not relevant to the point of interest. On the other hand if the FOV of cameras is taken into account for relevancy consideration, then the computational task becomes even greater and is also predicated on knowing and updating of the cameras' FOV.

In addition, when users are viewing multiple cameras in a conventional matrix view, positioning of the cameras in the matrix view may not be optimal. Even slight differences in the location of a point of interest may cause dramatic differences in the layout of the cameras in the view. For example, a user clicks on a location in the view and a search-ranked listing cameras is returned in a ranked order of a Camera 1, a Camera 2, and a Camera 3. Representations of these cameras are displayed in, e.g., a 2×2 matrix with Camera 1 being at position 1, etc. If the same user clicks on a nearby location in the view, the search-ranked list may return a ranked order of Camera 3, Camera 1, and Camera 1, thus changing the layout of the cameras in the 2×2 matrix as position 1 is now occupied by Camera 3. Thus a system that uses a purely rank search, does not necessarily return the same set of cameras in the same locations even when GPS locations are in very close proximity to each other.

According to an aspect, a surveillance system includes a plurality of cameras comprising optical components to capture and process optical energy to produce images, camera processing circuitry that receives the optical energy and processes the optical energy into electrical signals and encodes the signals into a defined format and a camera management system to conduct surveillance by the plurality of cameras over a defined geographic region. The camera management system includes one or more computing systems including a network device to receive the signals from the cameras, the one or more computer systems configured to, receive an image that covers an area that includes the defined geographic region, partition the image into a plurality tiles of a user specified number of tiles and of a user specified size of the tiles, and associate one or more of the plurality of cameras with a corresponding one or more of the plurality tiles.

According to an additional aspect, a method of video surveillance includes receiving by one or more computer systems executing a camera management process an image that covers an area that includes a defined geographic region, partitioning the one or more computer systems the image into a plurality tiles of a user specified number of tiles and of a user specified size of the tiles, and associating one or more of a plurality of cameras with a corresponding one or more of the plurality tiles.

According to an additional aspect a computer system executes a surveillance and the computer system includes one or more processor devices and memory associated with the processor devices. The processor devices are configured to receive an image that covers an area that includes a defined geographic region, partition the image into a plurality tiles of a user specified number of tiles and of a user specified size of the tiles, and associate one or more of a plurality of cameras with a corresponding one or more of the plurality tiles.

The following are some embodiments within the scope of one or more of the above aspects.

One or more of the aspects generate a user interface to allow a user to specify the size and layout of the matrix for the plurality of tiles and apply the size and layout of the matrix to partition the image into the respective plurality of tiles. One or more of the aspects generate a user interface to allow a user to override a position and content of the camera in the matrix for the tile. One or more of the aspects generate a user interface to allow a user to specify preset parameters for a camera that is associated with a tile. One or more of the aspects generate a user interface to allow a user to copy the matrix configuration for other tiles. One or more of the aspects generate a user interface to allow a user to merge multiple tiles into one tile. One or more of the aspects store in a database user defined association of cameras, camera preset parameters, camera locations in the matrix and the matrix layout of tiles. One or more of the aspects receive from a user a selection of a point of interest on the image and map the selection to a tile on the image by applying geographic coordinates corresponding to the user selected tile to geographic coordinates of cameras that are associated with the tile. One or more of the aspects retrieve from the database identifications of associated cameras by a lookup based on a tile id and cause video from one or more of the associated cameras to be rendered on the display. One or more of the aspects execute a search of available cameras to automatically associate each tile with relevant cameras by determining a distance between a center point of a tile of the grid. One or more of the aspects execute the search of the available cameras taking into consideration, obstructions and types of cameras.

One or more of the above aspects may provide one or more of the following advantages.

A video surveillance system that includes a plurality of cameras, such as video camera and/or audio transducers, e.g., microphones, especially a very large number of such cameras allows a user operator visual access to video information for operation during surveillance especially for a user defined point of interest. The gridding of the matrix display minimized one of the major limitations of traditional surveillance systems as the process generates a list of cameras for viewing based on a tile identification that is close to a point of interest. As the number of cameras become large, this process using the tile will execute faster than the traditional search and rank process over an entire geographic region to return a viable set of relevant cameras. In addition, this process can take into consideration the field of view (FOV) of the cameras and, thus may select a camera having a FOV that is more relevant to the point of interest than that which would happen with a traditional matrix view, while still improving on the computational speed to generate the list. In addition, when users are viewing multiple cameras in the tiled matrix view, positioning of the cameras in the matrix view become more optimal. Thus, slight differences in the location of a point of interest are less likely to cause dramatic differences in the layout of the cameras in the view.

The details of one or more embodiments of the invention are set forth in the accompanying drawings and the description below. Other features, objects, and advantages of the invention is apparent from the description and drawings, and from the claims.

DESCRIPTION OF DRAWINGS

FIG. 5 is a flow chart of a set up process in the central surveillance monitoring system.

FIG. 5A is an exemplary depiction of packaging of camera associations.

FIG. 6 is a flow chart of an operational process in the central surveillance monitoring system.

DETAILED DESCRIPTION

Described herein is an example of a central surveillance system that receives feeds from many cameras that are dispersed over a geographic region. The cameras can be disposed within a facility or building or plural facilities/buildings or can be dispersed over a wide geographic area such as portions of a city, as will be the example used in the description below.

Figure 1:
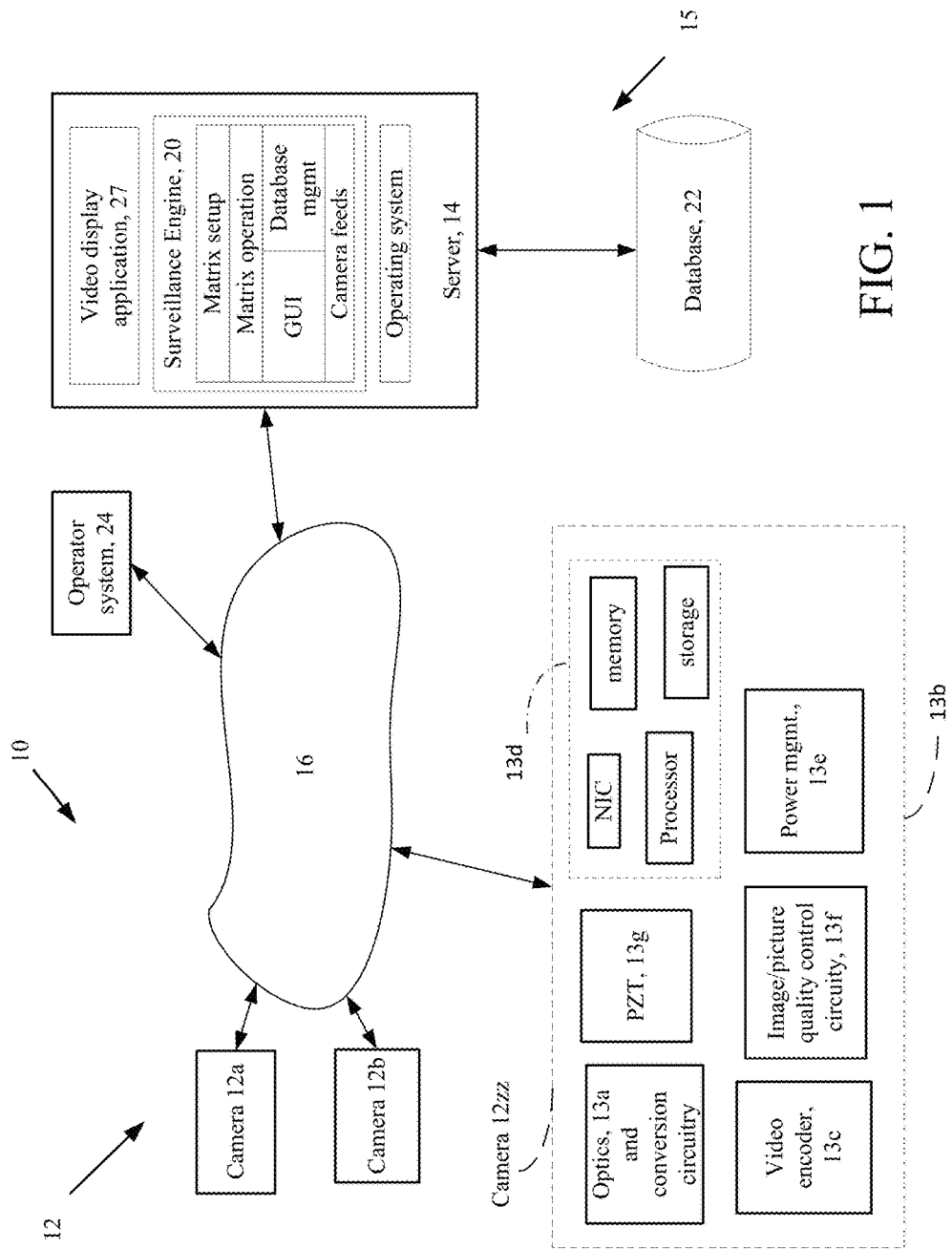
FIG. 1 is a block diagram of a central surveillance monitoring system.

Referring now to FIG. 1, a surveillance system 10 includes a plurality of cameras, e.g., in some implementations a very large plurality of cameras, generally 12, of which three (3) 12a, 12b . . . 12zz are diagrammatically illustrated. Each camera 12 includes optics, e.g., lens 13a, a camera body or case 13b, video encoder 13c, and in some instances power management circuitry 13e, circuitry for imaging and picture quality control 13f, and in some instances pan/tilt control and pan/tilt mechanisms, generally 13g. The specifics of the video cameras 12 can vary. The video cameras 12 also include a computing device 13d comprising, a processor, memory, storage and a network interface device or card (NIC) for communication over network 16 with a central surveillance system 15. The cameras 12 can also include local power storage, e.g., battery backup power (not shown).

The video cameras 12 illustrated are merely exemplary and in general the cameras 12 operate in a conventional manner with respect to the video encoder, optics, and circuitry for imaging and picture quality. The cameras 12 transmit via the NIC, video and/or still images and in some instances accompanying by audio (from microphones not shown) either wired or wirelessly (or both) to the central surveillance system 15.

The central surveillance system 15 includes one or more server computers 14, which in addition may include a web server (not shown). The server 14 includes a surveillance engine 20 that performs a number of functions including a grid setup process that allows a user via a user interface (not shown) to apply a grid to a regional map or regional image (either satellite or overhead image) at a resolution specified by the user to divide the regional map or regional image (herein after regional image) into a plurality of tiles, as will be discussed below. The matrix set up also allows the user to specify the number of tiles and to associate cameras with tiles, either a user specified or through an automatic process.

The central surveillance system 15 also includes one or more operator system(s) 24 (only one shown), which include computers (processors, memory and storage as well as interfaces, as needed, including a mouse and mouse interface (not shown)) that are operationally coupled to the server 14. The operator systems 24 include display devices to render interfaces discussed below as well as live video.

During active surveillance, the surveillance engine 20 receives camera feeds that are displayed on display devices (not shown) using a video display application 27. Displays can take various forms such as small monitors to very large wall mounted monitors. The surveillance engine 20 can include database management software to manage database 22 that stores video, etc. (or the surveillance engine 20 can include a process that manages a video tape library.) The server 14 also executes applications under control of an operating system, as well as other functions to interface with the cameras, etc.

Figure 2:
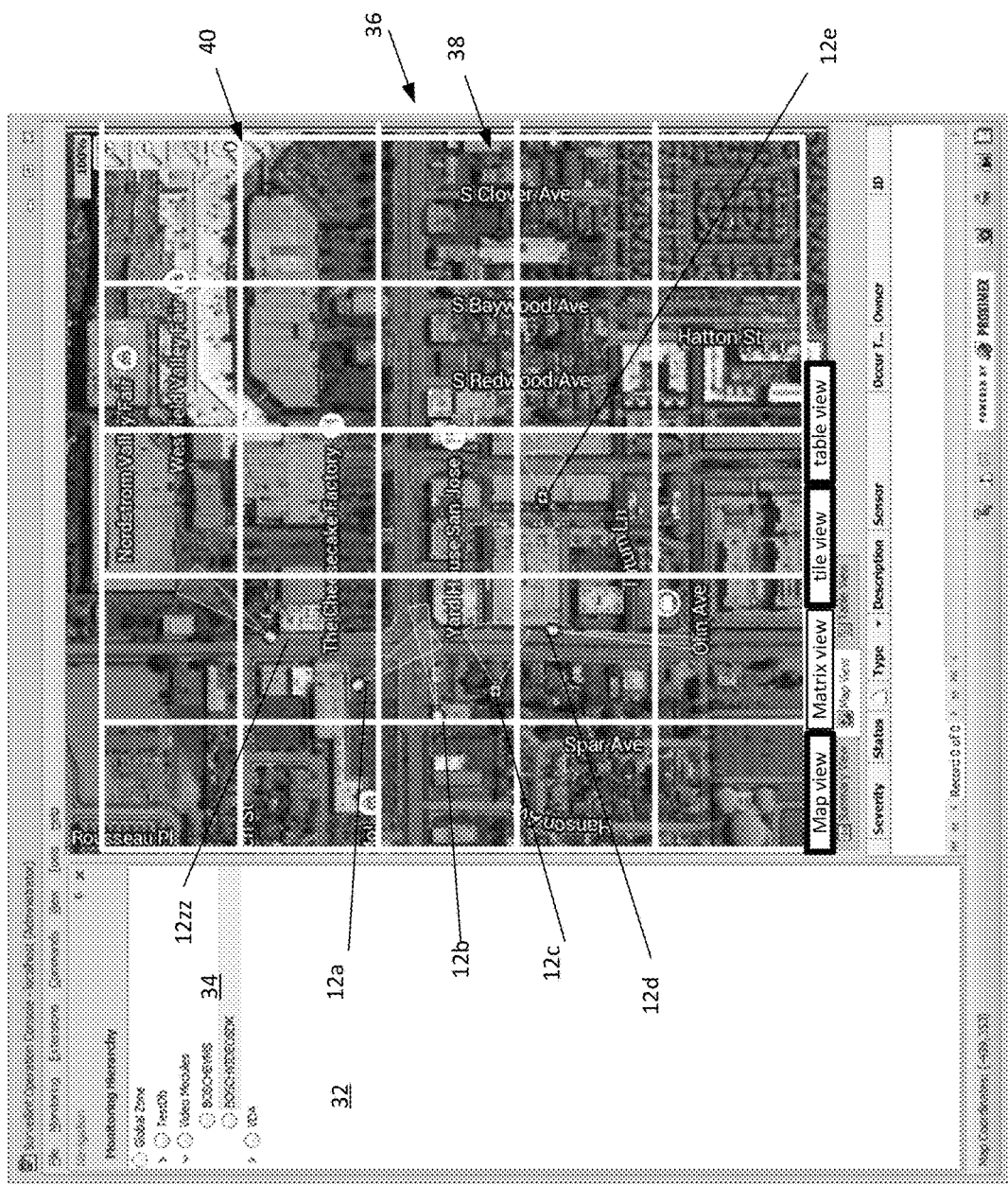
FIG. 2 is a depiction of a user interface including an image of a predefined geographic region with a tiled overlay on the image.

Referring now to FIG. 2, a user interface screen shot 30 is shown. In the screen shot, a frame 32 depicts a monitoring hierarchy 34 that delineates various hierarchical levels of zones (e.g., regions of camera) that are accessed from the database(s), e.g., 22 (FIG. 1). A main frame 36 depicts here a satellite image 38 having a superimposed grid 40. Also shown are controls for displaying a map view (a map showing streets, without real objects), matrix view (illustrated overlaid on the image), a tile view showing a single tile or group of tiles and a table view showing cameras and their geo-coordinates. Also shown are the cameras 12a, 12b-12d and 12zz (others not shown), represented in the figure as icons showing approximate field of view and which can be coded (using different symbols) based on the type of camera.

Figure 3:
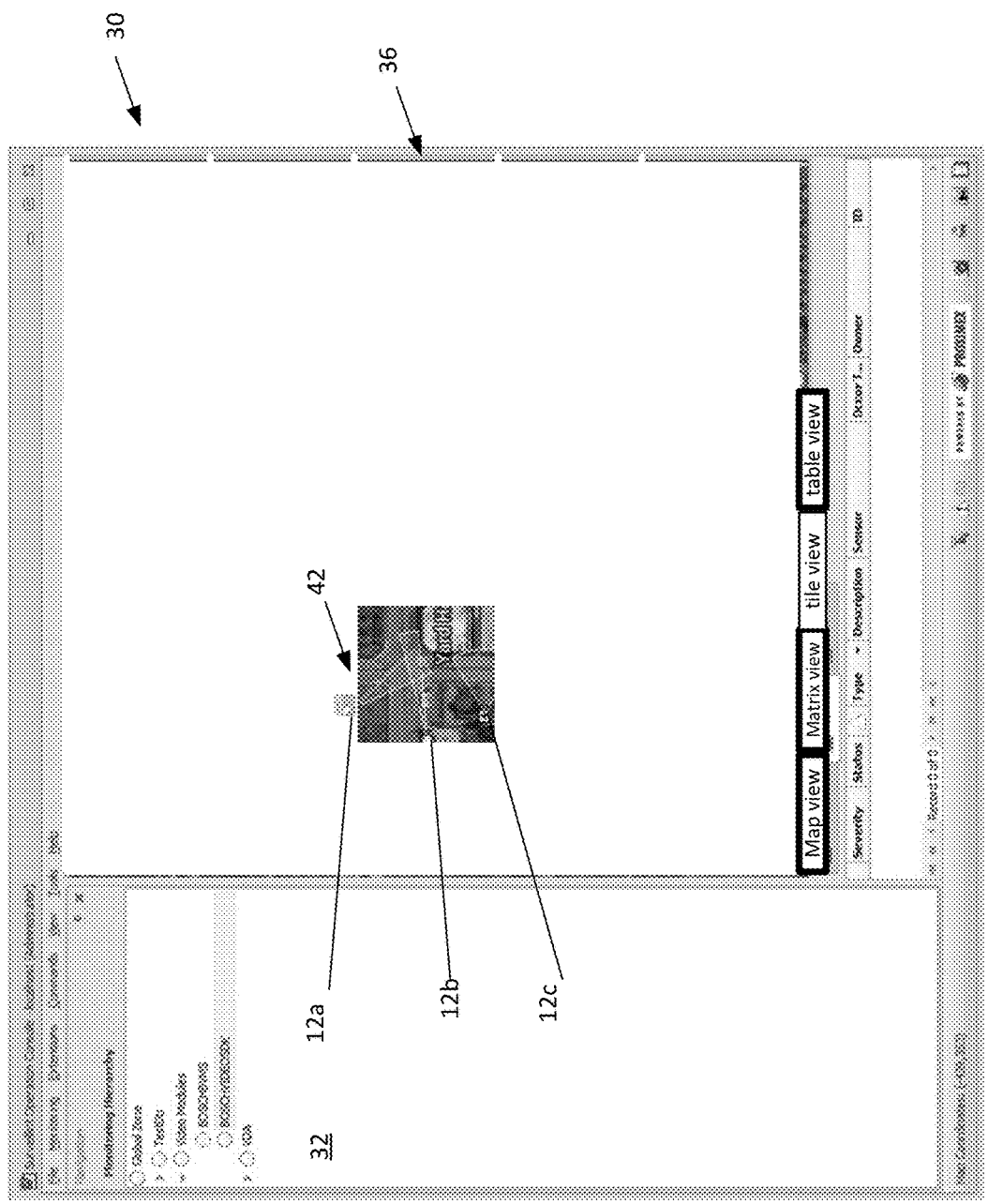
FIG. 3 is a depiction of the user interface with an isolated, user selected tile from the matrix.

Referring now to FIG. 3, the user interface screen shot 30 in tile view is shown focusing on a single tile 42 with cameras associated with that tile, as represented in the tile as shown. The main frame 36 depicts here the satellite image of that tile, with the control for displaying in tile view shown as asserted. As shown in that tile 42, cameras 12b and 12c are associated with that tile, whereas camera 12a (representation is shown greyed-out) is actually in a neighboring tile. While camera 12a is in the field of view of the tile 42, but for some reason was not associated with that tile 42. However, a user could modify tile 42 and/or associate camera 12a with tile 42, as discussed below. The main frame 36 depicts here the satellite image of that tile, with the control for displaying in tile view shown as asserted.

Figure 4:
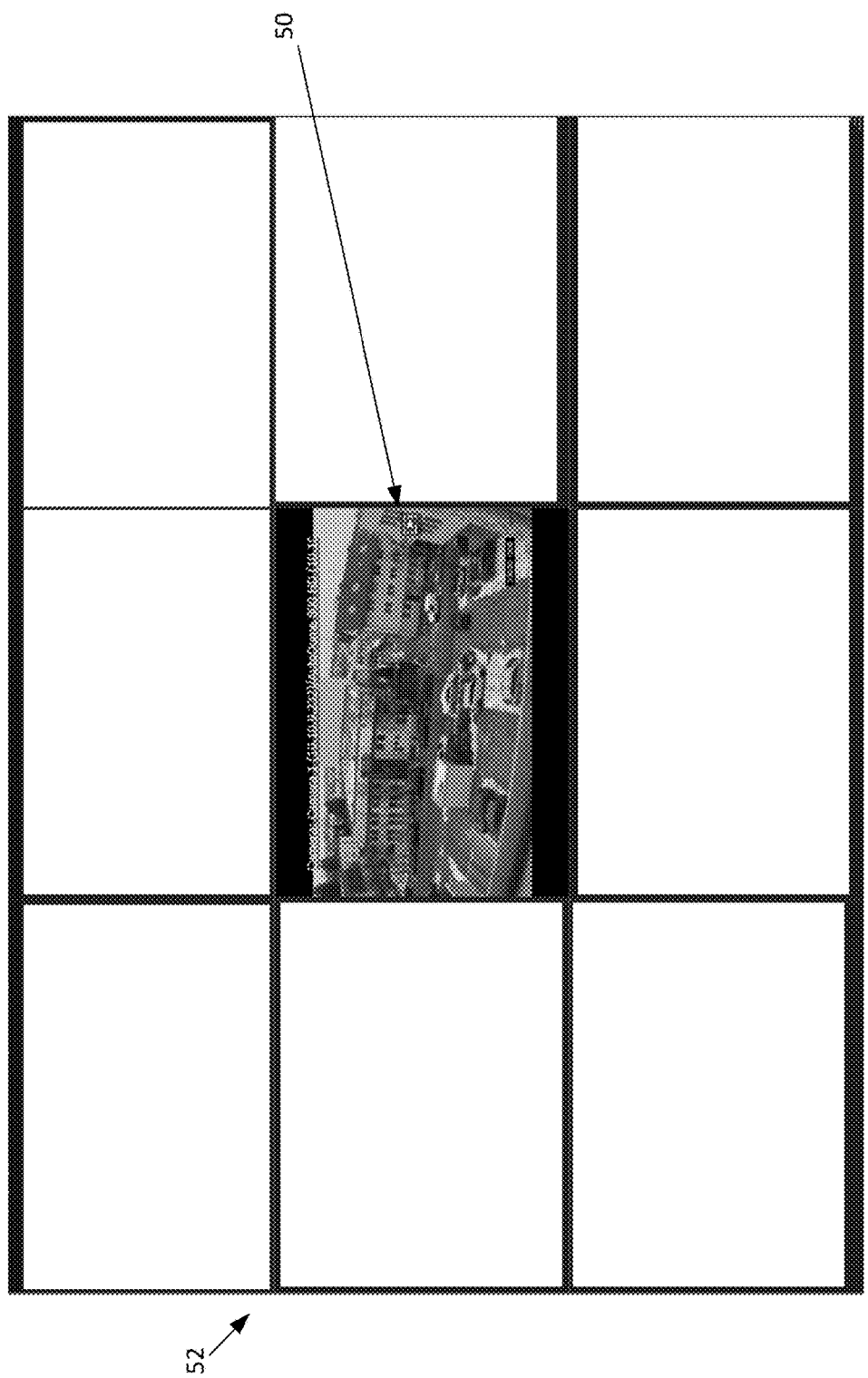
FIG. 4 is a depiction of video from a user selected camera associated with the user selected tile from the matrix of FIG. 3.

Referring now to FIG. 4, live video 50 from one of the cameras in the view of the single tile 42 (FIG. 3) is shown displayed on a video monitor devices 52. The view is from one of the cameras having been associated with tile 42. The user found that camera easily because of the prior association of the camera with the tile 42. The camera is thus selected by the user (operator) and shows live video 50 on the monitor 52 of the point of interest.

Referring now to FIG. 5, set up 60 of the surveillance engine 20 includes the server 14 (FIG. 1) executing the grid setup process 62 that allows the operator to configure the surveillance engine 20 to operate in the grid mode. The grid setup process 62 in the surveillance engine 20 generates 64 a user interface, (not shown) to apply various user defined criteria to the grid (for "gridding" a regional map or regional image (again either satellite or overhead image) at a resolution specified by the operator to divide the regional image into a plurality of tiles.

The grid set up also allows the user to specify the number of tiles and to associate cameras with tiles, either user specified or using an automatic process. Based on a center point on each tile of the grid, grid setup process 62 executes a search of available cameras to automatically associate each tile with relevant cameras. This process takes into consideration, the distance of the camera to the center of the tile, any obstructions in the way of the center to the tile and can also taking into consideration the type of camera, e.g., fixed or PZT, etc. This search process searches for close cameras that can be used to view areas within the tile.

More specifically, the search processes uses the GPS location of the center point of a tile and the GPS location data of available cameras. In addition, the search process can use information regarding the FOV of a camera as well as any available terrestrial information, e.g., notable obstructions for certain camera positions when automatically associating cameras to a tile. The server 14 executing the search process 66 generates a list of close cameras that are associated with the tile. The list is stored and used during active surveillance.

As discussed above, the surveillance engine 20 allows the operator to specify the size and layout of the matrix of tiles. The surveillance engine 20 also allows the operator to override position and content of the camera in the matrix for the tile. This is accomplished by a review process executed in the surveillance engine 20 to allow operators to select cameras and corresponding PTZ presets to occupy specific positional tiles in the video matrix. The surveillance engine 20 presents a pre-filtered ranked list of cameras to choose from and the surveillance engine 20 allows operators to add cameras in an ad-hoc fashion to the list. The surveillance engine 20 also allows the operator to specify relevant pan tilt and zoom parameters (PTZ parameters or "presets") for each camera in each tile by sending messages via the network to the particular PTZ type camera to modify the camera's position according the user selected presets. The surveillance engine 20 also allows the operator to copy the configuration for other tiles and the surveillance engine 20 also allows the operator to merge multiple tiles into one tile, which would involve re-setting of the parameters for the number of tiles and re-executing of a version of the grid setup process, e.g., by repeating the searching based on the new tiles or by merging of the associations into the new merged tile.

After the execution of the grid setup process 62 by the surveillance engine 20 on the server 14, data regarding the definition of cameras, any PTZ presets, camera locations in matrix and matrix layout with cameras associated to tiles in the grid, are stored in the database and but for any subsequent operator modifications, as discussed above, the data are ready for operational use.

This data is associated with a tile using various techniques. For example, a tile can be assigned an identification and can be assigned an identification of a file that contains the data regarding camera definitions and associations, discussed above, as shown in FIG. 5A, which illustrates a table 70 listing cameras 12b and 12c and Tile ID here of the tile 42 of FIG. 3. An operator at system 24 is provided with a handle to one of those cameras and uses the camera(s) to obtain live video as in FIG. 4.

Alternatively, the data regarding the definition of cameras, any PTZ presets, camera locations in matrix and matrix layout can be a hyperlink to file(s) that store the data, with each tile having its own hyperlink. This hyperlink would be embedded in the display of the tiles (FIG. 2 or FIG. 3) and when the tile in those figures is selected, e.g., by a mouse click (a mouse being a user selection or pointing tool used with the terminal or system coupled to the server 14.

Referring now to FIG. 6, during surveillance operation 80 by an operator, the operator executes matrix operational surveillance 82 at an operator system 24 (FIG. 1). The operator can decide (based on any of various inputs or no inputs) to apply surveillance to a point of interest in the matrix. The active surveillance operation retrieves 84 data of the relevant camera that can be mapped to the tile having the point of interest, by a simple lookup (user clicked on a tile) having a hyperlink embedded or by a very manageable search thru grid/tile boundaries for cameras that are associated with the tile. The relevant cameras in the matrix is acquired based on tile ID and the list of cameras is presented 86 to the operator. The operator can select/control 88 cameras as needed to examiner in detail the point of interest.

Administration

Thus, given a map/image of interest, a user executes the set-up process in the surveillance engine 20 to provide a grid resolution and default matrix layout. Automated processes perform a brute force camera mapping for each tile and populate the matrix layout with the results for each tile. The user can choose to select a tile and customize the matrix layout by added or removing cameras in matrix, by clicking with a mouse on a tile to have the associated cameras identifications show up to give operators a spatial sense of the cameras' locations in relation to the location of interest. The operators can change the matrix layout, move cameras in the matrix, select a PTZ preset definition for the PTZ camera pan tilt zoom and a user can copy the selection to other matrix elements. The user can merge the tiles, overriding one definition with another.

Operation

In operation a user click on the map displayed in the display device with, e.g., a mouse. The specific tile is identified either by Tile ID if tile indexing is used (i.e. UI knows the tile as that is being clicked on) or by simple containing a search on tile boundaries. Once a Tile is identified, the video display application 27 is populate with the relevant components for the matrix (layout, content, position, PTZ presets, etc.) If a PTZ Preset swing is required, the video display application 27 will read the definition and swing the cameras as needed for proper viewing.

More specifically, in operation, a user clicks on a map image with e.g., a mouse (or via touch display) and the click can trigger one of two chains of events. If the map display has the capability to identify the tile that was clicked, i.e., selected, the surveillance engine 20 performs a simple lookup for the selected tile's matrix definition and forward the information to the video display application 27 for display. If the map display does not have the capability to provide the identification of the tile, instead only the GPS position of the clicked location, then the surveillance engine 20 performs a simple rectilinear (e.g., x-y position locational) computation using the GPS location information to quickly identify the tile, thereafter perform a simple lookup for the tile's matrix definition and forward the matrix definition to the video display application 27 for display. The Tile's matrix definition contains all relevant information for matrix display including but not limited to the matrix layout, camera content, matrix position, and PTZ Presets per camera. Once the video display application 27 receives the matrix definition, the video display application 27 will display the predefined matrix view populated with predefined cameras actuated to predefined PTZ presets.

Memory stores program instructions and data used by the processor of the camera and operator systems and server systems. The memory may be a suitable combination of random access memory and read-only memory, and may host suitable program instructions (e.g. firmware or operating software), and configuration and operating data and may be organized as a file system or otherwise. The stored program instructions may be stored in the memory, also stored are software components allowing network communications and establishment of connections to the network. The software components may, for example, include an internet protocol (IP) stack, as well as driver components for the various interfaces, including the interfaces and the keypad. Other software components suitable for establishing a connection and communicating across network will be apparent to those of ordinary skill.

The server 14 includes one or more processing devices (e.g., microprocessors), a network interface and a memory (all not illustrated). The server 14 may physically take the form of a rack mounted card and may be in communication with one or more operator terminals or systems, e.g., 24 that include display devices (not shown).

The above features provide an optimal solution to improve performance and while allowing for user customization. Even without user intervention, the above features can provide performance gains even with taking into consideration FOV and PZT characteristics of the cameras.

The processor of each server acts as a controller for the server, and is in communication with, and controls overall operation, of the server. The processor may include, or be in communication with, the memory that stores processor executable instructions controlling the overall operation of the server.

The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. Physical hardware storage devices are not signals or prorogated carrier waves.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A surveillance system comprises:
   a plurality of cameras disposed in a defined region, the plurality of cameras comprising optical components to capture and process optical energy to produce images, camera processing circuitry that receives the optical energy and processes the optical energy into electrical signals and encodes the signals into a defined format and with each of the plurality of cameras having at least one field of view; and
   a camera management system to conduct surveillance by the plurality of cameras over the defined region, the camera management system comprising;
   one or more computing systems comprising a network device to communicate with the cameras, the one or more computing systems configured to:
   receive a first image of an area that includes at least the defined region covered by the plurality of cameras;
   overlay a grid onto the first image, wherein the grid partitions the first image into a matrix, wherein the matrix is comprised of one or more tiles, wherein the one or more tiles are of a user specified number and each of the tiles are of a user specified size;
   associate a particular camera with a particular tile according to a distance from the particular camera to a center of the particular tile and a field of view of the particular camera, wherein the association comprises assigning an identification file which contains data comprising camera definitions, generating a hyperlink and associating the hyperlink with the identification file;
   receive, from a user, a selection of a point of interest on the matrix:
   map the user selection to a selected tile on the matrix to determine a tile identifier of the selected tile; and
   retrieve, from a database, identifications of particular cameras of the plurality of cameras using the tile identifier.

2. The system of claim 1 wherein the first image is an overhead image of the defined region, and the one or more computing systems of the camera management system are configured to:
   generate a user interface to allow a user to specify the size and layout of the matrix; and
   apply the size and layout of the matrix to partition the overhead image.

3. The system of claim 1 wherein the one or more computing systems of the camera management system are configured to:
   generate a user interface to allow a user to modify the association of the particular camera with the particular tile.

4. The system of claim 1 wherein the one or more computing systems of the camera management system are configured to:
   generate a user interface to allow a user to specify preset parameters for a camera that is associated with a tile;
   generate by the camera management system messages specifying pan, tilt, and/or zoom parameters for each camera in each tile; and
   send the messages over a network to the particular cameras to modify camera positions according the pan, tilt, and/or zoom parameters.

5. The system of claim 1 wherein the one or more computing systems of the camera management system are configured to:
   copy a configuration of camera parameters from cameras in one of the tiles to other tiles.

6. The system of claim 1 wherein the one or more computing systems of the camera management system are configured to:
   generate a user interface to allow a user to merge multiple tiles into one tile.

7. The system of claim 2 wherein the one or more computing systems of the camera management system are configured to:
   store in a database user defined association of cameras, camera preset parameters, camera locations in the matrix and the layout of the matrix.

8. The system of claim 1 wherein the one or more computing systems of the camera management system are configured to:
   associate the particular camera with the particular tile based on obstructions and a type of the particular camera.

9. A method of video surveillance comprises:
   receiving by one or more computer systems executing a camera management process an image of an area, wherein the image includes a defined region covered by a plurality of cameras;
   overlaying by the one or more computer systems, a grid onto the image, wherein the grid partitions the defined region into a matrix, wherein the matrix is comprised of one or more tiles, wherein the one or more tiles are of a user specified number and each of the tiles are of a user specified size;
   associating by the one or more computer systems, a particular camera with a particular tile according to a distance from the particular camera to a center of the particular tile and a field of view of the particular camera, wherein the association comprises assigning an identification file which contains data comprising camera definitions, generating a hyperlink and associating the hyperlink with the identification file;
   receiving by the one or more computer systems, from a user, a selection of a point of interest on the matrix;
   mapping by the one or more computer systems, the user selection to a selected tile on the matrix to determine a tile identifier of the tile; and
   retrieving by the one or more computer systems, from a database, identifications of particular cameras using the tile identifier.

10. The method of claim 9 wherein association comprises:
    associate the particular camera with the particular tile based on obstructions and a type of the particular camera.

11. A computer system executing a surveillance process, the computer system comprising:
    a processor device; and
    memory associated with the processor device, and with the processor device configured to:
    receive an image of an area that includes a defined region;
    overlay a grid onto the received image, wherein the grid partitions the region into a matrix comprising a plurality tiles, according to user settings that specify a number of tiles and a size of the tiles;

associate a particular camera with a particular tile according to a distance from the particular camera to a center of the particular tile and a field of view of the particular camera, wherein the association comprises assigning an identification file which contains data comprising camera definitions, generating a hyperlink and associating the hyperlink with the identification file;

receive from a user a selection of a point of interest on the matrix;

map the user selection to a selected tile on the matrix to determine a tile identifier of the selected tile; and retrieve from a database, identifications of particular cameras of the plurality of cameras using the tile identifier.

12. The system of claim 1, wherein the one or more computing systems of the camera management system are configured to map the user selection perform a computation using a global positioning system (GPS) location of the user selection.

13. The method of claim 9, wherein mapping a user selection comprises performing a computation using a global positioning system (GPS) location of the user selection.

14. The system of claim 11, wherein the processor device is configured to map a user selection performs a computation using a global positioning system (GPS) location of the user selection.

15. The method of claim 9, wherein the retrieving of identifications of particular cameras comprises presenting identifications of the particular cameras as a ranked list.

* * * * *